UNITED STATES PATENT OFFICE.

LOUIS P. KRAUS, JR., OF NEW YORK, N. Y.

REFRACTORY PRODUCT.

1,289,049. Specification of Letters Patent. Patented Dec. 24, 1918.

No Drawing. Application filed February 13, 1915, Serial No. 8,048. Renewed March 29, 1917. Serial No. 158,435.

*To all whom it may concern:*

Be it known that I, LOUIS P. KRAUS, Jr., a citizen of the United States, residing at New York city, in the county of Kings and State of New York, have invented a new and useful Improvement in Refractory Products, of which the following is a full, clear, and exact description.

My invention relates to refractory products employed for withstanding high furnace temperatures and these materials may be used either in loose granular form or in molded kiln burned shapes. The object of the invention is to increase the heat resistance of such materials and also to provide a material which may be compressed or molded into bricks or blocks or refractory wares with the use of no bond or very little bonding material. On the other hand, on account of the high percentage of voids and the spongy character of the grains, and their high absorbent power it may be molded with a higher percentage of bond than is normally employed, if this is desired.

The treatment in accordance with the invention also greatly increases the resistance of the bricks or blocks over that of present refractory molded material. Heretofore the refractory materials requiring bond for molding or shaping, such as bauxite, chrome, magnesite, quartz, kaolin, clay, etc., have been seriously decreased in heat resistance by the presence of the bond having a lower softening point. In such cases, the heat resistance of the block is at a point somewhere between the resistance of the material itself and that of the bond, usually about midway between these points or temperatures. I have found that my material even when combined with a bond for molding or shaping has a considerably higher resisting power than the corresponding materials when similarly bonded without my treatment.

The natural materials also contain impurities having lower softening points than the pure material thus lessening their resistance; and have also distinct cleavage planes along which failure starts at high temperatures. By the use of my invention these cleavage planes are destroyed and the impurities are partly or wholly driven off or eliminated.

Moreover, owing to the spongy character of my improved material and its rough, irregular shape in grains with the lack of cleavage planes, the material under considerable pressure will bond itself together to form a shaped block, brick or refractory article without the use of a binder.

In carrying out my invention in its preferred form, I reduce the raw refractory material to a fine and preferably impalpable powder and mix it with finely ground combustible material, using preferably a large proportion of the latter to give good separation of the refractory particles during the heat treatment. As the combustible I preferably use ground wood, on account of its cheapness; and the preferable proportions are two parts by volume of ground wood to one part by volume of the mineral.

The intimately mixed materials are then mixed with water or liquids of a bonding nature, such as glucose, or other suitable material, and are molded into blocks of a convenient size which are dried.

When the blocks are thoroughly dried they are roasted at a temperature sufficient to produce clinkered material in the form of spongy grains with the cleavage planes destroyed.

This temperature is preferably about 300° F. below the melting point of the material and is above a roasting or calcining temperature. I preferably first heat up the mixed material, and at a time when it has reached a temperature below its melting point, oxygen preferably in the form of air is fed into the furnace to consume the oxidable impurities, thus driving off the impurities to a considerable extent. This heating may be continued as long as desirable.

The blocks or "biscuit" are then removed from the furnace and crushed to the proper degree of fineness best adapted to the purpose for which they are to be used.

The refractory material thus formed is composed of refractory grains of highly irregular shape with rough surfaces well adapted to knit together under pressure and having a high percentage of voids, the material being of a highly spongy nature. The spongy grains have a surface which may be described as arborescent and may be likened to a chestnut bur; and they have no definite lines or planes of cleavage. Their heat resisting properties are much greater than those of the material from which they are made and they may be used in loose form or may be compressed into bricks or blocks or other refractory articles. Referring specifically to bauxite as an example of my invention, the following may be taken as a fair sample of bauxite:

| | |
|---|---|
| $Al_2O_3$ | 55.10 |
| $SiO_2$ | 11.60 |
| $Fe_2O_3$ | 4.41 |
| $H_2O$ | 28.90 |

If the water in such bauxite were driven off by ordinary calcination, $Fe_2O_3$ would be present to the extent of about 6.3 per cent. of the total.

When treated by my process, the analysis of the grains produced is substantially as follows:

| | |
|---|---|
| $Al_2O_3$ | 82% |
| $SiO_2$ | 17% |
| $Fe_2O_3$ | 1% |

This material can be compressed and molded dry into the desired form with no bonding material and will retain its shape and may be handled and placed in a kiln of the ordinary type for burning in the same manner as brick are usually burned, except that for a brick composed of grains of a given material the burning temperature employed should preferably be considerably higher than would be employed for the same material in the making of a brick by the usual process.

The advantage of my improved material is here plainly evident as it is a well known fact with brick as usually made, that the higher the temperature at which they may be burned in the kiln the higher are the service conditions that they will endure. If a bond is used it may be employed in small proportions to prevent substantial impairing of the heat resisting qualities; or, if desired, a greater amount of bonding material may be used than ordinarily on account of the spongy character, the high percentage of voids, and lack of definite cleavage planes. Where bond is used the resisting quality of the material is not reduced thereby to the extent that it is in the ordinary refractory materials. The volume of the material may be decreased under molding pressure to a much greater extent than with the usual refractory materials.

Given a certain raw refractory material, if grains of the same sieve size of my material are compared with the grains of other products made from the same original material, it will be found that my material has a much greater percentage of voids, and this characteristic is what I intend to cover by the word "spongy" or of high porosity.

The advantages of my material will be obvious to those skilled in this art since the heat resistance qualities are greatly improved and longer life given under high temperatures. The material may be bonded or not, as desired, and any desired percentage of bond may be used. The material may be formed into any desirable shapes for resisting high temperatures and is adaptable to a wide variety of uses. I intend to cover the material in my claims whether it is compressed into a shaped or molded form and kiln burned or not.

The roasting operation may be carried out in any desirable manner and with any desirable type of furnace and the material may be roasted either in loose powdered form or in the form of cakes which are subjected to the oxidizing atmosphere which drives off impurities, breaks up the definite cleavage planes and produces the clinkered material in the form of spongy grains having the characteristics above described.

Fluxes may be added to the material if desired. If binders are used in molding the material, I may use any ceramic bond such as plastic clay. In compressing and shaping the material I preferably use a high pressure of from fifteen to twenty tons per square inch.

I claim:

1. A clinkered refractory material in the form of spongy grains, which are refractory under high furnace temperatures; substantially as described.

2. A clinkered refractory material in the form of spongy grains having a high percentage of voids and free from definite cleavage planes; substantially as described.

3. A heat-treated refractory material in the form of clinkered spongy grains having a higher percentage of voids than that of grains of the same size of the same material when raw, substantially as described.

4. A shaped kiln-burned refractory product formed of compressed or molded grains of clinkered refractory material, said grains being of a spongy character and rough irregular outline; substantially as described.

5. A shaped kiln-burned refractory product formed of compressed or molded refractory material having clinkered grains of a spongy character combined with a bond; substantially as described.

6. A shaped refractory product formed of highly compressed or molded spongy clinkered grains free from definite cleavage planes; substantially as described.

7. A shaped refractory kiln-burned product formed of highly compressed or molded spongy clinkered grains free from definite cleavage planes and united by a bond; substantially as described.

8. Refractory material in the form of purified spongy clinkered grains free from definite cleavage planes, substantially as described.

9. Clinkered refractory bauxite in the form of spongy grains having a higher percentage of voids than that of bauxite of the same size when raw, and free from definite cleavage planes, substantially as described.

10. A shaped refractory product formed of compressed or molded spongy clinkered bauxite grains, substantially as described.

In testimony whereof I have hereunto set my hand.

LOUIS P. KRAUS, Jr. [L. S.]

Witnesses:
  CHAS. E. KRAUS,
  HARRY ROCKER.